No. 741,711. PATENTED OCT. 20, 1903.
J. PHELAN & L. BRAUND.
MUSTACHE CURLER.
APPLICATION FILED JAN. 31, 1903.
NO MODEL.
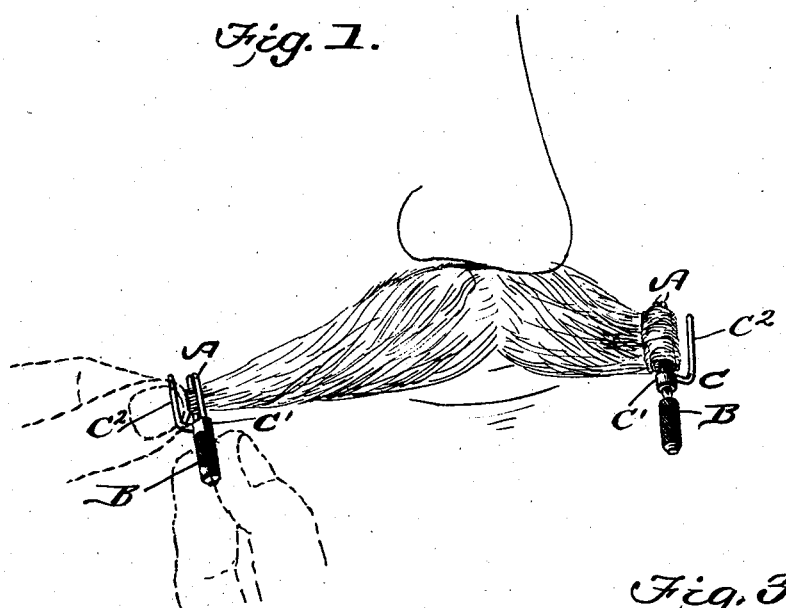
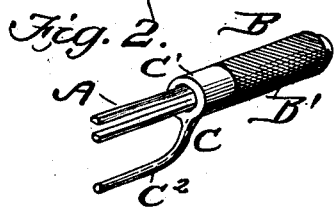
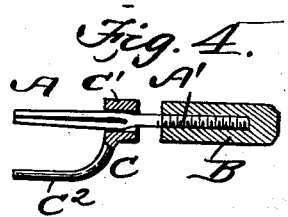
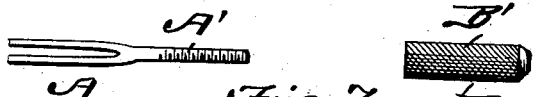
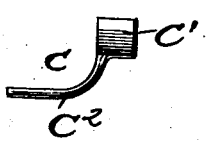
Inventors
John Phelan
Louis Braund, No. 741,711.

Patented October 20, 1903.

UNITED STATES PATENT OFFICE.

JOHN PHELAN AND LOUIS BRAUND, OF JACKSON, MICHIGAN.

MUSTACHE-CURLER.

SPECIFICATION forming part of Letters Patent No. 741,711, dated October 20, 1903.

Application filed January 31, 1903. Serial No. 141,338. (No model.)

*To all whom it may concern:*

Be it known that we, JOHN PHELAN and LOUIS BRAUND, citizens of the United States, residing at Jackson, in the county of Jackson and State of Michigan, have invented a new and useful Mustache-Curler, of which the following is a specification.

This invention is an improved device for curling the hair, and is particularly adapted for curling the ends of a mustache, the object being to provide a simple and efficient device by means of which the ends of a mustache may be securely grasped while being curled or twisted and afterward held in such position until the mustache is thoroughly curled.

With these objects in view the invention consists, essentially, in the employment of a bifurcated twisting-iron having a handle detachably connected thereto, the members of said bifurcated twisting-iron being normally separated a short distance from each other, and a supporting-bracket in which the twisting-iron is arranged, said supporting-bracket being adapted to force the members of the bifurcated iron together for the purpose of grasping the mustache.

The invention consists also in certain details of construction and novelties of combination, all of which will be fully described hereinafter and pointed out in the claims.

In the drawings forming part of this specification, Figure 1 is a view showing the practical application of our invention. Fig. 2 is a detail perspective view of the device ready for use. Fig. 3 is a side elevation showing the curling-iron moved so as to force the members together for the purpose of grasping the mustache. Fig. 4 is a sectional view, partly in elevation. Fig. 5 is a detail view of a curling-iron. Fig. 6 is a detail view of the detachable handle, and Fig. 7 is a detail view of the bracket. Fig. 8 is a detail perspective view showing a modification, the curling-iron being formed in two parts.

In carrying out our invention we employ a bifurcated curling-iron A, the shank A' having a handle B detachably connected thereto, said handle being preferably roughened or milled, as shown at B', so that the curling-iron can be readily rotated. The curling-iron, with the handle connected thereto, is carried by a bracket C, comprising a bearing portion C' and a projecting finger $C^2$. The shank A' of the curling-iron is passed through the bearing portion C' of the bracket and a handle is then connected thereto.

In operation the bearing portion C' of the bracket is pushed down upon the shank A' until the bearing portion contacts with the handle, and when in this position the members of the curling-iron are separated, which readily admits the end of the mustache being inserted between the said members. The projecting finger $C^2$ of the bracket is then grasped between the thumb and forefinger of either hand, and the handle is then grasped between the thumb and forefinger of the other hand, and by rotating or twisting the handle between the fingers it will be readily seen that the bifurcated members of the iron are also twisted and the mustache wound thereon, as shown to the left in Fig. 1 of the drawings. After the mustache has been thus wound upon the iron the handle is drawn downwardly, which causes the bifurcated members to enter or be drawn into the bearing portion C' for a short distance, which firmly presses the members of the bifurcated iron together and also locks the bracket firmly in place, and in this position the hold is relaxed, when the projecting finger $C^2$ will be thrown against the face of the user by reason of the tendency of the mustache to uncurl; but it will be readily seen that the mustache will be prevented from uncurling by the finger $C^2$, as before stated.

It will be readily seen that we provide an exceedingly cheap, simple, and efficient construction of curling device that can be quickly and easily applied and removed and one that can be left upon the mustache for a short space of time without the least discomfiture or annoyance.

In Fig. 8 we have shown the curling-iron made in two pieces $A^2$, each piece having an offset or shouldered portion $A^3$, and the ends are threaded, as shown at $A^4$, so that when the sections of the iron are placed together the handle can be screwed thereon.

Having thus fully described our invention, what we claim as new, and desire to secure by Letters Patent, is—

1. A curling device of the kind described comprising a bifurcated curling-iron and a handle detachably connected thereto, a tubular bearing through which the curling-iron passes, and a finger integral with the bearing and extending substantially parallel with the bifurcated end of the curling-iron, as specified.

2. The combination with a bifurcated curling-iron having a shank portion, a handle on said portion, a cylindrical bearing adapted to rest on the shank portion adjacent the handle and to slide on the bifurcated members and press them together, and a projecting finger connected to said bearing.

JOHN PHELAN.
LOUIS BRAUND.

Witnesses:
THOMAS A. WILSON,
M. ELIZABETH HAMMOND.